United States Patent
Min et al.

(10) Patent No.: US 11,617,091 B1
(45) Date of Patent: Mar. 28, 2023

(54) DISTRIBUTED ANTENNA SYSTEM

(71) Applicant: PROSE Technologies Co., Ltd., Jiangsu (CN)

(72) Inventors: Haijun Min, Jiangsu (CN); Rui Zhang, Jiangsu (CN); Lei Xu, Jiangsu (CN); Hang Zhang, Jiangsu (CN)

(73) Assignee: PROSE TECHNOLOGIES (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 17/750,306

(22) Filed: May 21, 2022

(30) Foreign Application Priority Data

Dec. 6, 2021 (CN) .......................... 202111472836.8

(51) Int. Cl.
| | |
|---|---|
| *H04B 10/00* | (2013.01) |
| *H04W 16/20* | (2009.01) |
| *H04B 7/022* | (2017.01) |
| *H04L 5/14* | (2006.01) |
| *H04B 10/2575* | (2013.01) |
| *H04W 88/08* | (2009.01) |

(52) U.S. Cl.
CPC ............ *H04W 16/20* (2013.01); *H04B 7/022* (2013.01); *H04B 10/25753* (2013.01); *H04L 5/14* (2013.01); *H04W 88/085* (2013.01)

(58) Field of Classification Search
CPC .......... H04B 10/2575; H04B 10/25751; H04B 10/25752; H04B 10/25753; H04B 10/27; H04B 10/40; H04B 10/2507; H04B 10/0795; H04B 10/25759; H04W 88/085; H04W 16/20; H04W 16/26

USPC ... 398/115, 116, 117, 66, 67, 68, 69, 70, 71, 398/72, 100, 158, 159, 33, 38, 135, 136, 398/160, 79, 96; 370/328, 329, 338, 352, 370/392, 389, 468; 455/445, 524, 450, 455/562.1, 422.1

See application file for complete search history.

(56) References Cited

U.S. PATENT DOCUMENTS

| | | | | |
|---|---|---|---|---|
| 8,548,330 | B2 * | 10/2013 | Berlin .............. | H04B 10/25752 398/115 |
| 9,825,690 | B2 * | 11/2017 | Cho ......................... | H04B 1/40 |
| 9,871,163 | B2 * | 1/2018 | Shim ....................... | H01L 33/08 |
| 9,900,097 | B2 * | 2/2018 | Palanisamy ......... | H04W 88/085 |
| 11,057,961 | B2 * | 7/2021 | Byun ....................... | H04B 1/40 |
| 2011/0008042 | A1 * | 1/2011 | Stewart ............... | H04W 88/085 398/115 |

(Continued)

*Primary Examiner* — Hanh Phan

(57) ABSTRACT

A distributed antenna system comprises: a plurality of ports configured to receive downstream signals or transmit upstream signals; a plurality of first antennas configured to transmit the downstream signals or receive the upstream signals; a power regulating unit coupled between the plurality of ports and the plurality of first antennas and configured to transfer and regulate the downstream signals or the upstream signals, wherein the power regulating unit comprises: a plurality of first links respectively corresponding to different frequency bands, and a first power regulating section configured to regulate power of link signals transferred over each first link, such that link signals of different frequency bands transferred over the plurality of first links have substantially the same power. The solution of the present disclosure can support input of signals at multiple frequency bands, achieve power balance and improve system performance and wireless coverage effects.

20 Claims, 13 Drawing Sheets

(56) References Cited

U.S. PATENT DOCUMENTS

| | | | |
|---|---|---|---|
| 2015/0249513 A1* | 9/2015 | Schwab | H04W 88/085 370/278 |
| 2016/0056540 A1* | 2/2016 | Famili | H05K 5/0021 455/562.1 |

* cited by examiner

DISTRIBUTED ANTENNA SYSTEM

FIELD

The present disclosure relates to the field of wireless communications, and more specifically, to a distributed antenna system.

BACKGROUND

Indoor wireless signal coverage refers to coverage manner for indoor facilitates such as residential buildings, subway, airports, sports venues, hotels and mall complexes etc. With the growing popularity of the Fifth Generation Mobile Communication Technologies (5G), about 85% of traffic flow would occur in the indoor scenarios. For this, the indoor wireless signal coverage directly affects the indoor experience of 5G applications. However, 5G millimeter waves have weak penetration and are prone to interferences in spatial transmissions, and the indoor facilitates usually have many blockages, strong interferences and complicated environments. In such case, the solution of covering the indoor with outdoor base stations performs badly. Therefore, mobile communication networks, known as distributed antenna system, may be constructed for indoor wireless coverage. In such communication networks, information sources connect to a plurality of spatially discrete antenna nodes through signal transmission media, to implement better signal coverage.

Loads of problems exist in the current distributed antenna systems. For example, in the presence of signals at different frequency bands or from various operators, the system delivers unsatisfactory wireless coverage or even fails to support input of signals at different frequency bands or from various operators. Besides, the bandwidth of the current system also influences the transmission rate. The system is also constructed at high costs and its design combination lacks flexibility.

SUMMARY

To at least partially solve the above and other possible problems, embodiments of the present disclosure propose an improved distributed antenna system, which can support input of signals at multiple frequency bands, achieve power balance and improve system performance and wireless coverage effects.

In accordance with one aspect of the present disclosure, there is provided a distributed antenna system, comprising: a plurality of ports configured to receive downstream signals or transmit upstream signals; a plurality of first antennas configured to transmit the downstream signals or receive the upstream signals; a power regulating unit coupled between the plurality of ports and the plurality of first antennas and configured to transfer and regulate the downstream signals or the upstream signals, wherein the power regulating unit comprises: a plurality of first links respectively corresponding to different frequency bands, and a first power regulating section coupled to the plurality of first links and configured to regulate power of link signals transferred over each of the first links, such that link signals of different frequency bands transferred over the plurality of first links have substantially the same power.

Embodiments of the present disclosure may regulate power of link signals having different frequency bands in the distributed antenna system, to achieve power balance between the link signals at different frequency bands and improve the wireless coverage effects of the antenna system. This improved system supports any combinations of a plurality of different frequency bands, to meet the needs of various users.

In some implementations of the present disclosure, the distributed antenna system further comprises: one or more optical fibers coupled between the power regulating unit and the plurality of first antennas and configured to transfer optical signals between the power regulating unit and the plurality of first antennas. The optical fiber transmission brings advantages to the distributed antenna system, including low loss, strong anti-interference capability and rapid transmission speed etc.

In some implementations of the present disclosure, the power regulating unit comprises: a first combiner section; a plurality of second links each corresponding to one port of the plurality of ports, and coupled to the corresponding port at one side, wherein the plurality of second links are divided into a plurality of groups; and each group corresponds to one first link of the plurality of first links and is coupled to the corresponding first link via the first combiner section at the other side; and a plurality of second power regulating sections each corresponding to one of the plurality of groups and configured to regulate power of link signals transferred over each of the second links in the corresponding group, such that link signals of different properties transferred over respective second links in the corresponding group have substantially the same power. The implementations may regulate link signals of respective second links in each second link group, to ensure that signals within the same frequency band, e.g., from different operators, have the same power level.

In some implementations of the present disclosure, the power regulating unit further comprises: a second combiner section; and a photoelectric converter section coupled at one side to the plurality of first links via the second combiner section, and at the other side to the one or more optical fibers, wherein the photoelectric converter section is configured to convert between electric signals and optical signals. Through these implementations, signals of the plurality of first links are combined for output, which reduces the number of optical fibers provided for transmission.

In some implementations of the present disclosure, the photoelectric converter section comprises an analog ultra-wide band laser module/circuit. Accordingly, the implementation supports higher bandwidth transmission, e.g., transmission at a bandwidth of 500 MHz for 5G NR.

In some implementations of the present disclosure, the distributed antenna system also comprises: one or more optical network extender units coupled to the one or more optical fibers and configured to compensate and extend optical signals of the one or more optical fibers, to obtain more channels of optical signals; one or more photoelectric composite cables coupled to the one or more optical network extender units and configured to transfer optical signals and electric power; and one or more first optical integrated remote units coupled to the one or more photoelectric composite cables and further coupled to the plurality of first antennas, or including the plurality of first antennas, and wherein the one or more first optical integrated remote units are configured to receive electric power, convert between optical signals and electric signals, and compensate signals. The implementations may freely expand signal transmission and emission within the distributed antenna system as required and effectively compensate the losses in the transmission, so as to ensure that a power balance is still achieved when the respective link signals have various transmission distances.

In some implementations of the present disclosure, the distributed antenna system further comprises: one or more second optical integrated remote units coupled to the one or more first optical integrated remote units in cascade and further coupled to a plurality of second antennas that are configured to transmit the downstream signals or receive the upstream signals, or including the plurality of second antennas, and wherein the one or more second optical integrated remote units are configured to receive electric power, convert between optical signals and electric signals, and compensate signals. In this way, the downstream signals from the information source may be expanded to more antennas and transferred to the mobile terminals within a wider space range. Alternatively, the upstream signals may be received via more antennas from the mobile terminal within a wider space range.

In some implementations of the present disclosure, each of the one or more first optical integrated remote units and the one or more second optical integrated remote units comprises a duplexer or a circulator and an isolating switch located on each radio frequency link, wherein the duplexer or circulator is configured separate link signals in each radio frequency link into uplink signals and downlink signals, and the isolating switch is configured to adjust radio frequency attenuation to maximum if a radio frequency link in which the isolating switch is located is free of signals. The implementations may separate the link signals into uplink signals and downlink signals and further compensate the signals, so as to increase the degree of isolation between the channels and enhance the anti-interference capability.

In some implementations of the present disclosure, the distributed antenna system further comprises: one or more first high power remote units coupled between the one or more optical fibers and the plurality of first antennas and configured to convert between optical signals and electric signals and compensate signals. Through the implementations, information source signals at different frequency bands and from various operators may be transferred to the high power remote units via optical fibers or cables for signal coverage, thereby constructing high power two-tier architecture.

In some implementations of the present disclosure, the distributed antenna system further comprises: a plurality of second antennas configured to transmit the downstream signals or receive the upstream signals; and one or more second high power remote units coupled between the one or more first high power remote units and the plurality of second antennas in a cascade manner, and configured to convert between optical signals and electric signals and compensate signals. In this way, the downstream signals from the information source may be expanded to more antennas and transferred to the mobile terminals within a wider space range. Alternatively, the upstream signals may be received via more antennas from the mobile terminal within a wider space range.

In some implementations of the present disclosure, the first power regulating section or the each second power regulating section comprises: an attenuator located over each first link or each second link in the corresponding group, a detector for detecting link signals of each first link or each second link in the corresponding group, and a controller that controls the attenuator based on detection signals of the detector. These implementations may effective detect and regulate power of link signals over respective first links, to ensure that the link signals at different frequency bands are transferred at basically the same power level.

In some implementations of the present disclosure, each first link of the plurality of first links comprises a duplexer or a circulator configured to separate link signals in each first link into uplink signals and downlink signals. Accordingly, the signals over the first link may be separated into uplink signals and downlink signals, and frequency division duplexing or time division duplexing is supported.

In some implementations of the present disclosure, the distributed antenna system further comprises: one or more combiner units coupled between the plurality of ports and the power regulating unit. Therefore, the cables provided for transmission are reduced and the system structure is simplified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The embodiments of the present disclosure will be described below in more details with reference to the drawings. Although the drawings illustrate the embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art. Those skilled in the art may obtain alternative technical solutions based on the following description without deviating from the spirit and the protection scope of the present disclosure.

As used herein, the term "includes" and its variants are to be read as open-ended terms that mean "is not limited to." The term "or" is to be read as "and/or". The term "based on" is to be read as "based at least in part on." The terms "one example embodiment" and "one embodiment" are to be read as "at least one example embodiment." The term "unit", "module", "section" and "port" include circuit/circuits. The following text also can include other explicit and implicit definitions.

In the embodiments of the present disclosure, there is provided an improved distributed antenna system, in which a power regulating unit/circuit is provided for adjusting power balance between different frequency bands and thus improving wireless coverage of the antenna system. Besides, the improved system supports any combinations of various frequency bands, to meet different needs of the users.

Figure 1:
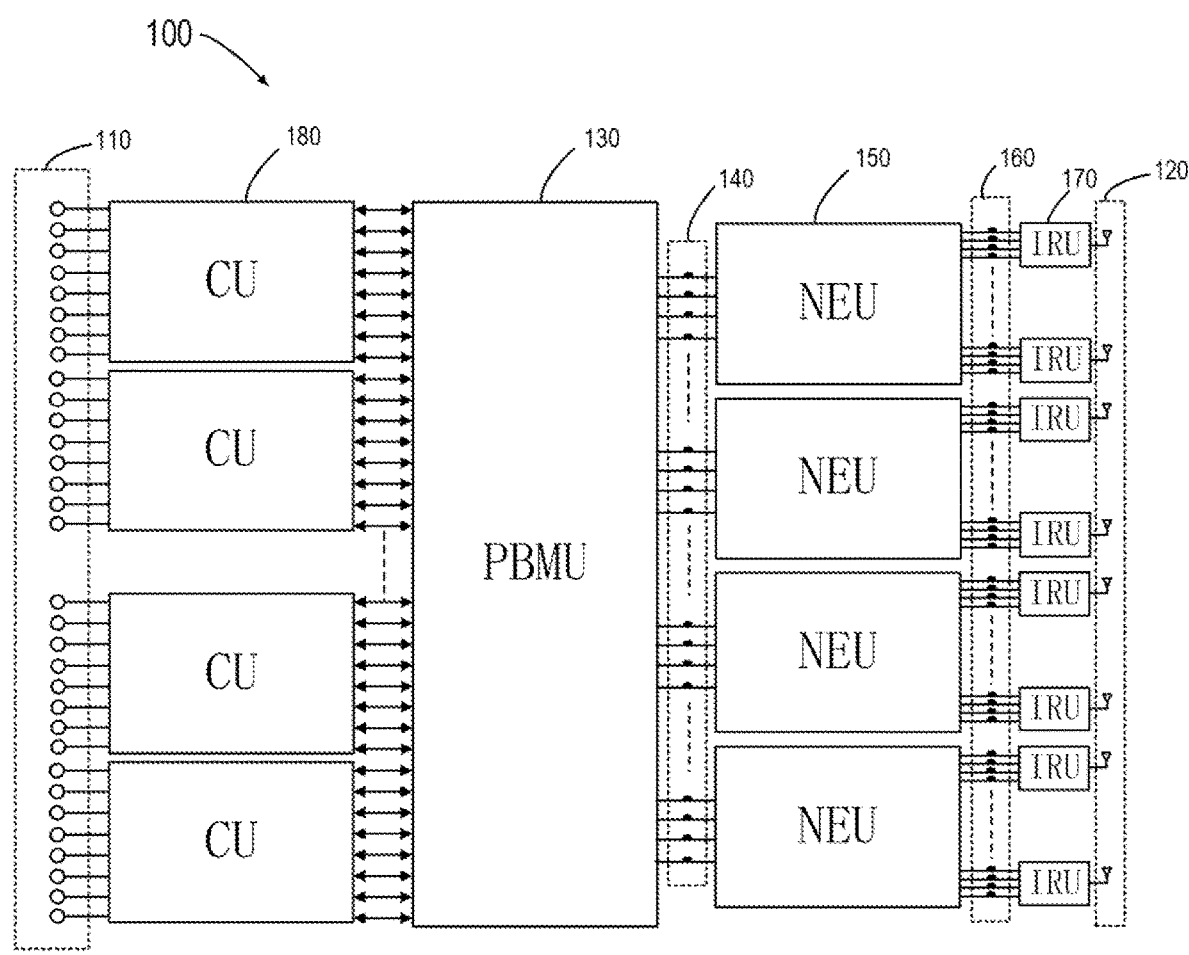
FIG. 1 illustrates a schematic block diagram of a distributed antenna system in accordance with embodiments of the present disclosure.

FIG. 1 illustrates a distributed antenna system 100 in accordance with embodiments of the present disclosure. According to the embodiments of the present disclosure, the distributed antenna system 100 may include a plurality of ports/port circuits 110 configured to receive downstream signals or transmit upstream signals. For example, the plurality of ports 110 may be connected to a variety of information sources, such as Remote Radio Unit (RRU) or base station cell with radio frequency output (e.g., small cell). The information sources may provide signals at different frequency bands, or signals of one or more operators. The distributed antenna system 100 may receive from various information sources downstream signals via the plurality of ports 110, so as to pass the upstream signals from a mobile terminal to the information sources.

In accordance with embodiments of the present disclosure, the distributed antenna system 100 may include a plurality of first antennas 120 configured to transmit downstream signals or receive upstream signals. As an example, the plurality of first antennas 120 may be spatially separated. For instance, they may be mounted at different locations of an indoor facility to cover a space as large as possible. Thus, the plurality of first antennas 120 may transmit the downstream signals from the information sources to mobile terminals at different locations within the space, or receive upstream signals from the mobile terminal.

In accordance with embodiments of the present disclosure, the distributed antenna system 100 may include a power regulating unit/circuit 130 coupled between the plurality of ports 110 and the plurality of first antennas 120, and configured to transfer and regulate the downstream or upstream signals. As an example, the power regulating unit 130 may be referred to as Power Balance Master Unit (PBMU) that regulates power of the downstream signals from a plurality of ports 110, or power of upstream signals from the plurality of first antennas 120.

Figure 2:
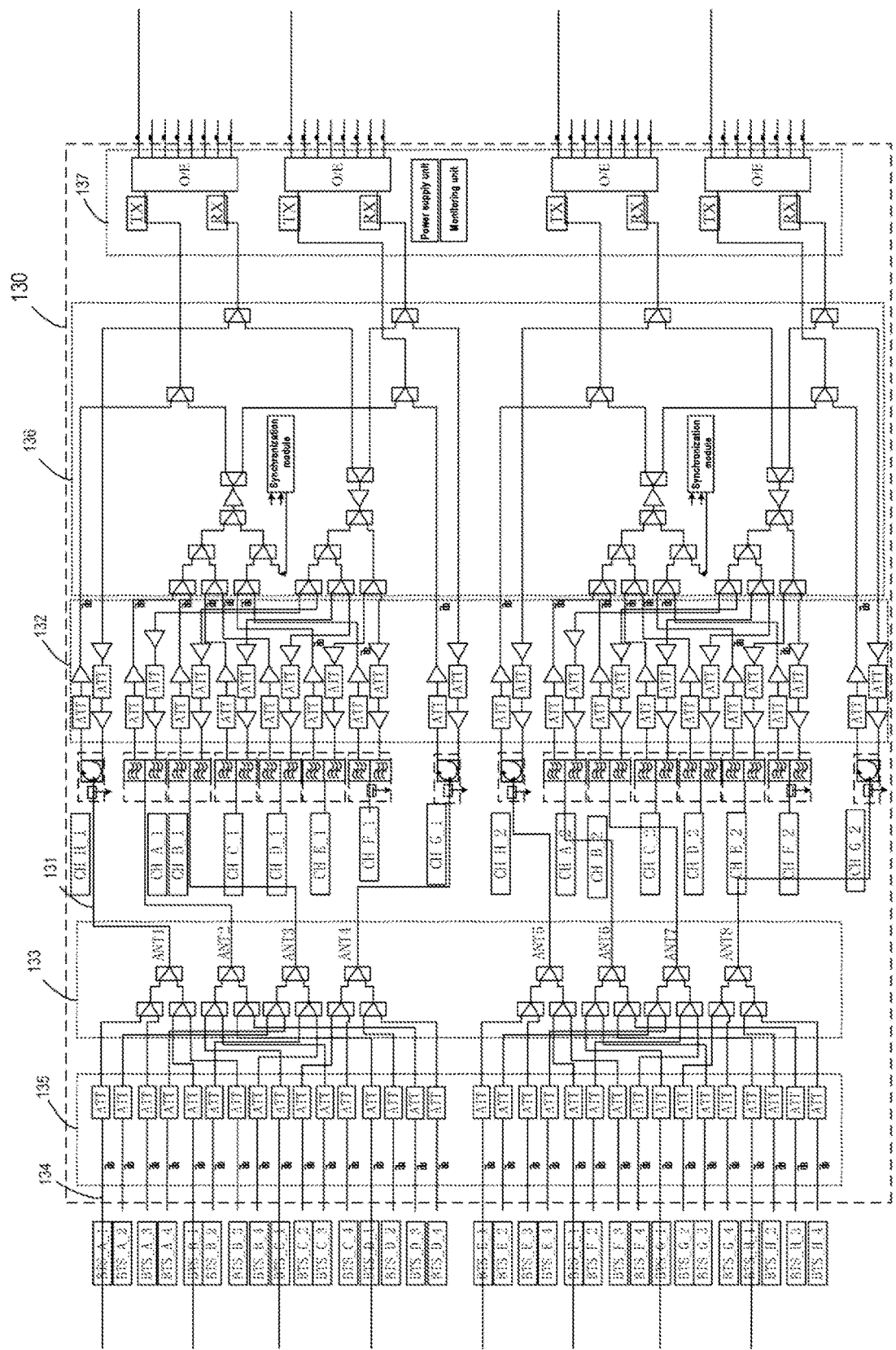
FIG. 2 illustrates a structural diagram of a power regulating unit of the distributed antenna system in accordance with embodiments of the present disclosure.

FIG. 2 shows a structural diagram of the power regulating unit 130 of the distributed antenna system 100 in accordance with embodiments of the present disclosure. According to the embodiments of the present disclosure, the power regulating unit 130 may include a plurality of first links 131 respectively corresponding to different frequency bands and a first power regulating section/section circuit 132 coupled to the plurality of links 131 and configured to regulate power of link signals transferred over each of the first links 131, such that the link signals having different frequency bands transferred over the plurality of first links 131 have substantially the same power. As an example, the downstream signals from the plurality of ports 110 or the upstream signals from the plurality of first antennas 120 may be transferred over the plurality of first links 131, and different first links 131 may be used for transferring signals at different frequency bands. The first power regulating section 132 may regulate the signals over the plurality of first links 131, such that link signals having different frequency bands have basically the same or consistent power, thereby reaching power balance. It is to be noted that under the power balance, the power of respective link signal is regulated to be identical with each other while an error is allowed within a certain range, for example, the downlink output power is allowed to have an error of ±1dB. As such, power transmission of link signals within the system is improved without burdening power consumption and costs of system devices. For instance, the relatively weak link signals are boosted to improve signal coverage of the distributed antenna system. It should be appreciated that although the distributed antenna system 100 illustrated in FIG. 1 only includes one power regulating unit 130, it is also possible that two, three or more power regulating units 130 are provided in the distributed antenna system 100 as required.

In some embodiments of the present disclosure, the first power regulating section 132 includes an attenuator (ATT) located on each first link 131, a detector for detecting link signals over each first link 131, and a controller that controls the attenuator ATT as a function of detection signal of the detector.

As an example, the detector, for example, may include a coupler arranged on each first link 131 and a radio frequency detecting circuit coupled to the coupler. Each coupler may acquire, from the corresponding first link 131, power signals in proportion to power of links signals, and provide the acquired power signals to the radio frequency detecting circuit. The radio frequency detecting circuit then converts the power signals from the coupler into analog voltage, which for example goes through an analog-to-digital conversion and then is output to the controller by an analog-to-digital converter. The controller may receive detection signals for all first links 131 over which the link signals are being transferred, and control the attenuator ATT (such as numerical control attenuator) over these first links 131, to regulate the signal power on the first links 131. Accordingly, the power on the first links 131 is regulated to be the same, so as to ensure that the link signals at different frequency bands are transferred at basically the same power level.

In some embodiments of the present disclosure, the plurality of first links 131 each include a duplexer or circulator, which duplexer or circulator is configured to separate link signals in each first link into uplink signals and downlink signals. Due to the duplexer, the distributed antenna system 100 may support signal transmission in the form of Frequency Division Duplexing (FDD). Besides, with the aid of the circulator, the distributed antenna system 100 may support signal transmission in the form of Time Division Duplexing (TDD). Moreover, the above mentioned detector and attenuator ATT may be disposed respectively in the uplink portion and downlink portion of the first link, to detect and regulate the signal power in the uplink portion and the downlink portion separately. An amplifying tube may also be disposed in the uplink portion and downlink portion of the first link, if needed, to compensate the transmission loss.

In some embodiments of the present disclosure, the power regulating unit 130 also includes a first combiner section/section circuit 133, a plurality of second links 134 and a plurality of second power regulating sections/section circuits 135. Each second link 134 corresponds to one of the plurality of ports 110 and is coupled to the corresponding port at one side. The plurality of second links 134 is divided into a plurality of groups, wherein each of the plurality of groups corresponds to one first link of the plurality of first links 131 and is coupled to the corresponding first link 131 via the first combiner section 133 at the other side. Each of the plurality of second power regulating sections 135 corresponds to one of the plurality of groups and is configured to regulate power of link signals transferred over each second link 134 in a corresponding group, such that the link signals of different properties being transferred over the respective second links 134 in the corresponding group have basically the same power. It is to be noted that similar to the power balance in the first links, the regulated power of the respective second links 134 in the corresponding group is also allowed to have an error within a reasonable range, for example, the downlink output power is allowed to have an error of ±1 dB.

As an example, the second links 134 may be divided into a plurality of groups based on the frequency band. In other words, the second link 134 of each group transfers signals within the same frequency band. Meanwhile, different second links in each group may transfer signals with different properties from various operators. The first combiner section 133 combines the signals of the second link in each group into one channel of signal and passes to the corresponding first link 131. Each second link group may correspond to one second power regulating section 135. In such case, the second power regulating section 135 may regulate the link signals of respective second links in each group, to ensure that signals from different operators within the same frequency band have the same power.

In some embodiments of the present disclosure, each second power regulating section 135 includes the attenuator ATT located on each second link of the corresponding group, the detector detecting link signals of each second link in the corresponding group, and the controller that controls the attenuator ATT depending on the detection signals of the detector. Specifically, each second power regulating section 135, when provided with the attenuator ATT, detector and controller therein, may regulate the power of link signals of the respective second links in the corresponding second link group. The attenuator ATT (e.g., numerical control attenuator), detector and controller in each second power regulating section 135 follow a working principle similar to that of the first power regulating section 135, so the details of the working principle are not repeated here.

As shown in FIG. 1, in some embodiments of the present disclosure, the distributed antenna system 100 also includes one or more optical fibers coupled between the power regulating unit 130 and the plurality of first antennas 120 and configured to transfer optical signals therebetween. The optical fiber transmission brings advantages to the distributed antenna system 100, including low loss, strong anti-interference capability and rapid transmission speed etc. In one embodiment, the distributed antenna system 100 may employ analog fiber technologies. That is, signals transferred by one or more optical fibers 140 of the distributed antenna system 100 are analog signals, which may further enhance transmission speed and bandwidth of the system. In some embodiments, the distributed antenna system 100 transfers analog signals, which analog signals may be converted into digital signals via the analog-to-digital converter within a part of the unit, so as to perform digital processing in this part of the unit. Subsequent to the digital processing, the digital signals are converted back to analog signals via the digital-to-analog converter for transmission.

In some embodiments of the present disclosure, the power regulating unit 130 also includes a second combiner section/section circuit 136 and a photoelectric converter 137 coupled at one side to the plurality of first links 131 via the second combiner section 136 and at the other side to the one or more optical fibers 140. The photoelectric converter 137 is configured to perform conversions between electric signals and optical signals. As an example, the second combiner section 136 may combine the downstream signals of the plurality of first links 131, so as to transfer the combined signals to the plurality of first antennas 120 via the one or more optical fibers 140, or divide the upstream signals from the one or more optical fibers 140 into several channels of signals for transmission over the plurality of first links 131. It is to be appreciated that although the power regulating unit 130 shown in FIG. 2 includes only one photoelectric converter section/section circuit 137, it is also possible that two, three or more photoelectric converter sections 137 are disposed in the power regulating unit 130 as required.

In some embodiments of the present disclosure, the photoelectric converter section 137 includes analog ultra-wide band laser modules/circuits. As an example, the respective photoelectric modules/circuits in the photoelectric converter section 137 may be provided in the form of analog ultra-wide band laser modules. In the analog ultra-wide band laser module, the downstream radio frequency RF signals, after being input, are split into 8 channels of optical signals by an optical power splitter for output. In addition, eight independent photoelectric conversion and reception units/circuits are used for the upstream, to convert multiple channels of optical signals into radio frequency RF signals and then combine them into one radio frequency RF signal for output. An optical transceiver circuit of the laser module may modulate the downstream wideband radio frequency signals to an optical wavelength of 1550 nm for transmission, and further modulate the upstream wideband radio frequency signals to an optical wavelength of 1310 nm for transmission. With the analog ultra-wide band laser module being configured, the distributed antenna system 100 may support at least one signal of 2G/3G/4G/5G signals while enabling wideband transmission. Besides, the distributed antenna system may also support a frequency range from 690 MHz to 3800 MHz for the upstream and downstream. In some embodiments, the analog ultra-wide band laser module of the photoelectric converter section 137 may detect power values of the received eight channels of optical signals in real time and independently compensate the respective optical links for their loss. This ensures that the respective signals would induce different optical fiber losses on account of the various remote distances. Furthermore, the amplitudes of respective output signals still remain the same because of the adaptive compensation.

According to FIG. 1, in some embodiments of the present disclosure, the distributed antenna system 100 also includes one or more optical network extender units/circuits (Network Extender Unit-Optical, NEU) 150, one or more photoelectric composite cables 160 and one or more first optical integrated remote units/circuits (Integrated Remote Unit-Optical, IRU) 170. The one or more optical network extender units 150 are coupled to the one or more optical fibers 140 and configured to compensate and extend the optical signals of the one or more optical fibers 140, to obtain more channels of optical signals. The one or more photoelectric composite cables 160 are coupled to the one or more optical network extender units 150 and configured to transfer optical signals and electric power. The one or more first optical integrated remote units 170 may be coupled to the one or more photoelectric composite cables 160, so as to receive/transmit signals from/to the photoelectric composite cables 160. The one or more first optical integrated remote units 170 are also coupled to the plurality of first antennas 120, or may include the plurality of first antennas 120, i.e., the first antenna 120 may be provided as a part of the first optical integrated remote unit 170. The one or more first optical integrated remote units 170 may be configured to receive electric power, convert between optical signals and electric signals, and compensate the signals. As an example, the power regulating unit 130 may support 32 optical fibers to connect to 8 optical extender units/circuits 150. Each optical extender unit 150 may support connection to 8 first optical integrated remote units 170 via the photoelectric composite cables, and an individual first optical integrated remote unit 170 may support coupling to a plurality of antennas (e.g., 8 antennas). Alternatively, the first antenna 120 may be integrated or built in the first optical integrated remote unit 170, for example, 8 antennas may be built in an individual optical integrated remote unit 170. In the optical network extender unit 150 and the first optical integrated remote unit 170, the optical power values received via respective channels may be detected in real time, and the loss of the respective optical links is compensated independently. As such, when the respective channels induce different optical fiber losses on account of the various remote distances in the distributed antenna system, the amplitudes of the output signals in respective channels are made identical through the adaptive compensation. Moreover, by providing the one or more photoelectric composite cables 160, the power may be supplied to the remote units, thereby effectively supporting the operations of the remote units.

Figure 3:
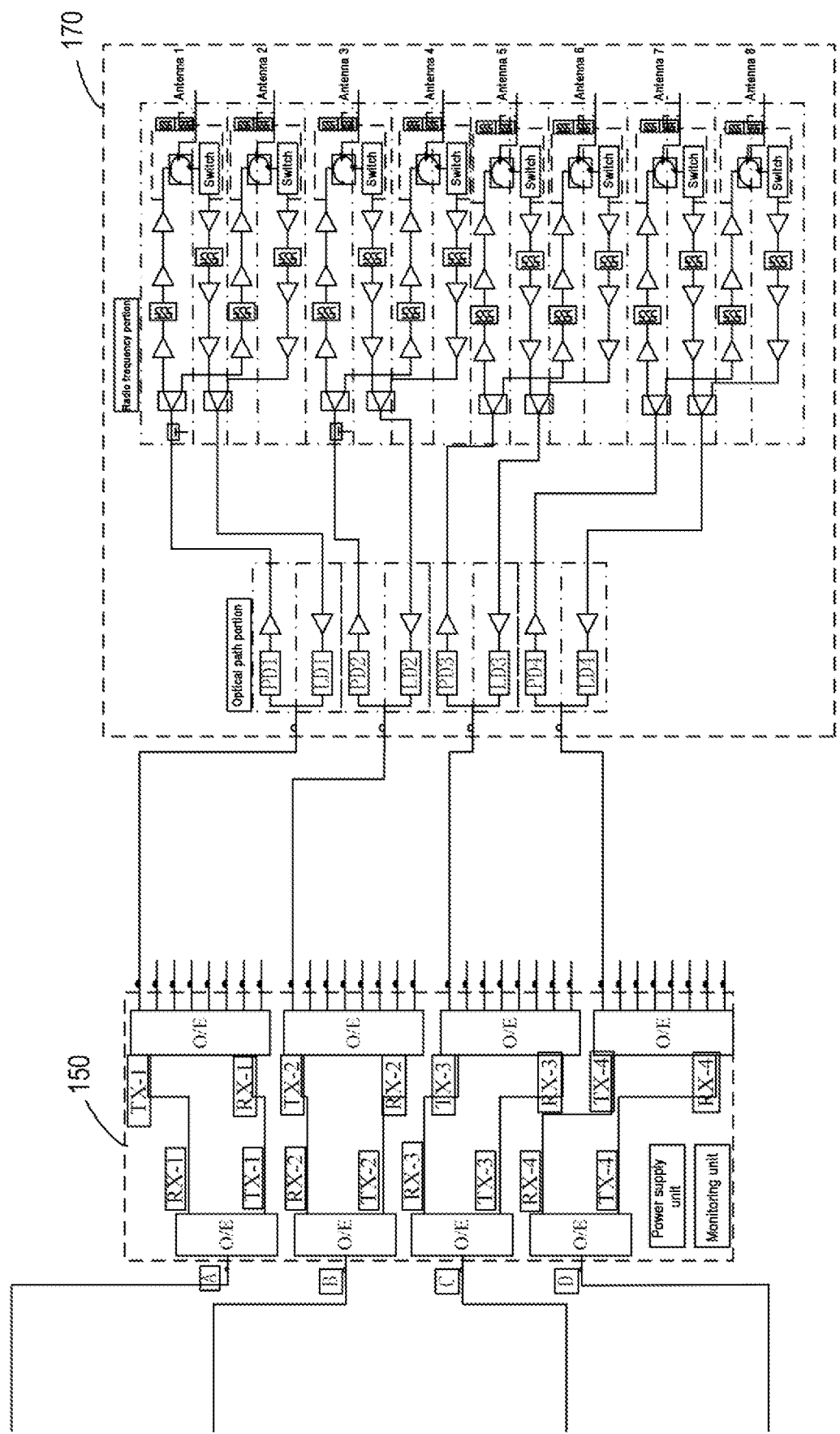
FIG. 3 illustrates a structural diagram of an optical network extender unit and a first optical integrated remote unit of the distributed antenna system in accordance with embodiments of the present disclosure.

FIG. 3 illustrates a structural diagram of the optical network extender unit 150 and the first optical integrated remote unit 170 in the distributed antenna system 100 in accordance with embodiments of the present disclosure.

As an example, each optical network extender unit 150 may correspond to an optical port of the power regulating unit 130. In the optical network extender unit 150, the optical signals from the power regulating unit 130 and the one or more optical fibers 140 may be wavelength division multiplexed into upstream and downstream signals, which are further converted into radio frequency signals by the photoelectric converter. The amplifying tube and attenuator ATT may be provided on the radio frequency links, wherein the amplifying tube may amplify the upstream and downstream signals to compensate loss of the optical transmission, while the attenuator ATT is used for adjusting power of the upstream and downstream signals. Afterwards, the radio frequency signals are converted by the photoelectric converters into the optical signals. The upstream and downstream signals are merged by wavelength division multiplexing and further extended by the optical splitter into multiple channels of signals. The multiple channels of signals are provided to a plurality of optical ports. Accordingly, based on the requirements, the optical network extender unit 150 may extend the signal of the optical port into multiple channels of signals and output the multiple channels of signals to the first optical integrated remote signal 170 via the plurality of optical ports, thereby implementing signal extension.

In some embodiments, the power regulating unit 130 and the optical network extender unit 150 may include respective monitoring units. The monitoring unit of the power regulating unit 130 may dynamically allocate the address to the optical network extender unit 150 and monitor the state of links bound to the optical network extender unit 150, while the monitoring unit of the optical network extender unit 150 may dynamically allocate the address to the optical integrated remote unit 170 and monitor the state of links bound to the optical integrated remote unit 170. To be specific, connections between optical ports of adjacent devices may change (e.g., because of insertion and plugging of the optical fiber). For this, before each round of monitoring on the connecting state of the optical fiber or in case of changes of an alarm state of the optical port, addresses may be allocated to the optical network extender unit NEU and/or optical integrated remote unit IRU, to implement dynamic address allocation. Additionally, the optical fiber links bound to the optical network extender unit NEU and/or optical integrated remote unit IRU are monitored according to the allocated address.

As an example, grouping of the respective photoelectric conversion modules and optical receiving channels in the photoelectric converter 137 of the power regulating unit 130 may be determined based on different system formats. For example, in the links from the power regulating unit 130 (e.g., PBMU) to the optical network extender unit 150 (i.e., NEU), with respect to the two-transmit and two-receive (2T2R) system format, the four photoelectric conversion modules in the photoelectric converter 137 are divided into two groups. The first module (optical ports 1-8) and the second module (optical ports 9-16) belong to one group, where optical ports 1 and 9 are primary path and backup path for each other and connected to the same NEU; and the rest is done in a similar fashion. The third module (optical ports 17-24) and the fourth module (25-32) belong to the other group. The monitoring unit/circuit of the PBMU records light receiving alarm for each optical port in the photoelectric conversion module. In case of no light receiving alarm, it is determined that the optical port is connected to the NEU. The PBMU switches off all light receiving channels of the photoelectric conversion module, then sequentially switches on light receiving switches (e.g., light receiving switch of optical ports 1 and 9) without light receiving alarm in the photoelectric conversion module of each group, and transmits validation information. After the NEU returns information acknowledgement, the PBMU transmits the addresses ready for allocation to the NEU for confirmation. After receiving the acknowledgement information, the PBMU automatically allocates the address of the NEU. Subsequently, the monitoring unit of the PBMU may monitor the state of the links bound to the NEU. By a similar fashion, the monitoring unit of the optical network extender unit 150 (i.e., NEU) may dynamically allocate addresses for the optical integrated remote unit 170 (i.e., IRU) and monitor the state of the links bound to the IRU. In this way, devices at a higher level (such as PBMU) may automatically monitor the operations of the devices at a lower level (e.g., NEU and/or IRU). Therefore, the state of the overall optical fiber link is automatically monitored without manual work, which makes the system link monitoring easier and more time-sensitive.

In some embodiments of the present disclosure, the first optical integrated remote unit 170 includes a duplexer or circulator and an isolating switch, wherein the duplexer or circulator is configured to separate the link signals in each radio frequency link into uplink signals and downlink signals, and the isolating switch is configured to adjust the radio frequency attenuation to maximum if the radio frequency link where the isolating switch is located has no signals. As an example, an optical path of the first optical integrated remote unit 170 may include photoelectric converting means that convert optical signals to electric signals or electric signals to optical signals. A radio frequency portion of the first optical integrated remote unit 170 separates the link signals into uplink and downlink signals and further compensates these signals. The isolating switch of the first optical integrated remote unit 170 may adjust the radio frequency attenuation to maximum if the link has no signals, to increase the isolation between the channels and further boost the anti-interference capability. In the end, the first optical integrated remote unit 170 may transmit the downstream signals via the first antenna 120, or receive the upstream signals via the first antenna 120.

In some embodiments, the power regulating unit 130 and the first optical integrated remote unit 170 may be compatible with, for example, transmission of at least two TDD switching signals of 4G TDD and 5G TDD. As an example, the power regulating unit 130 may include a first synchronization module/circuit for the first system and a second synchronization module/circuit for the second system, wherein the first synchronization module generates first downstream switching signals, such as 4G downstream switching signal, and the second synchronization module generates second downstream switching signals, e.g., 5G downstream switching signals. The power regulating unit 130 may transmit the first downstream switching signals and the second downstream switching signals in a time-sharing manner to the first optical integrated remote unit 170 via one optical fiber interface. The first optical integrated remote unit 170 receives and detects the downstream TDD switching signals and then outputs first downstream toggle switch signals, first upstream toggle switch signals, second downstream toggle switch signals and second upstream toggle switch signals associated with the downstream TDD switching signals. Therefore, the present disclosure is compatible with transmission of two TDD switching signals and transmission of upstream and downstream toggle switch signals.

Figure 4:
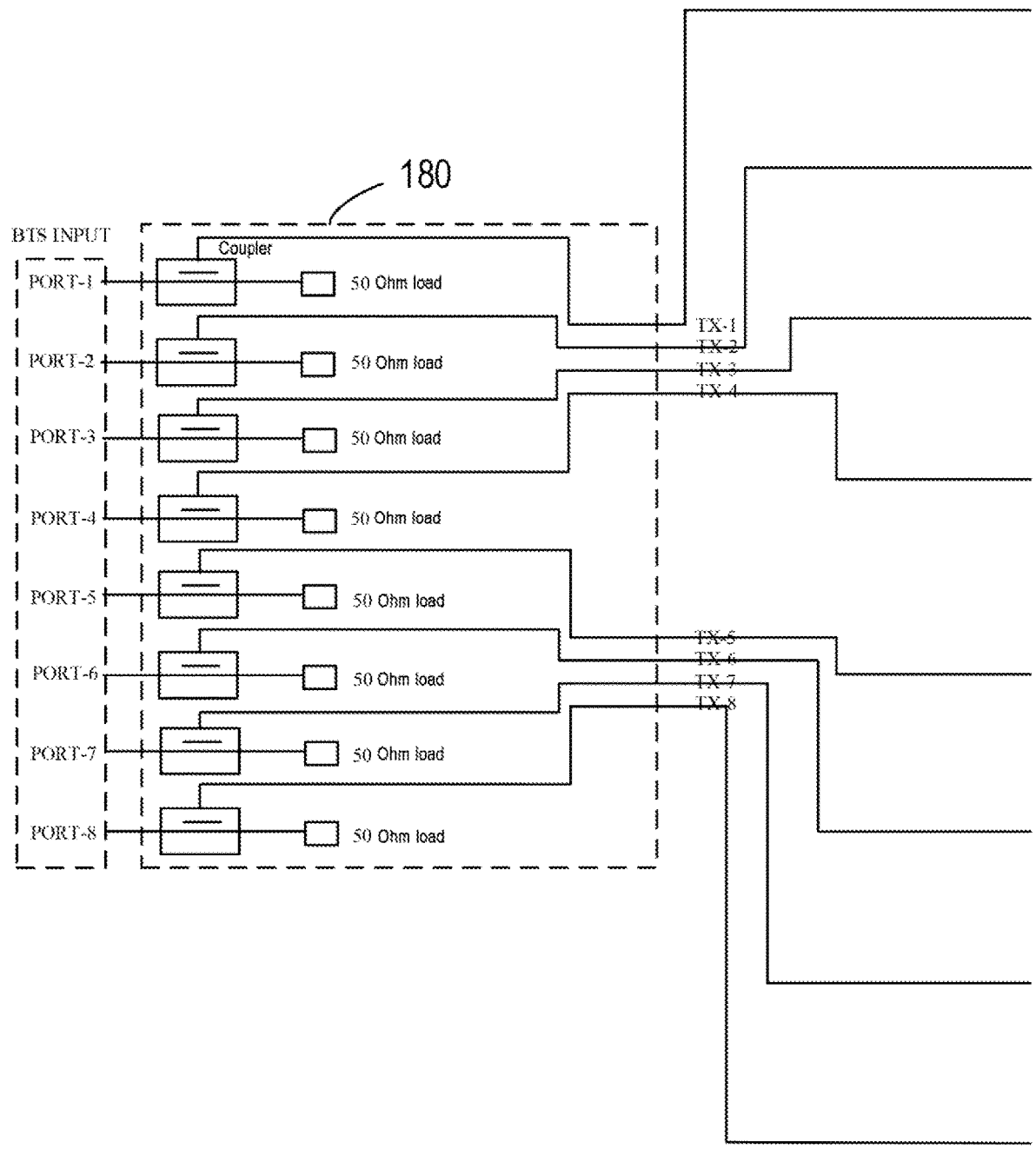
FIG. 4 illustrates a structural diagram of a combiner unit of the distributed antenna system in accordance with embodiments of the present disclosure.

In some embodiments of the present disclosure, the distributed antenna system 100 also includes one or more combiner units/circuits (Combiner Unit, CU) 180 coupled between the plurality of ports 110 and the power regulating unit 130. FIG. 4 illustrates a structural diagram of the combiner unit 180 of the distributed antenna system 100 in accordance with embodiments of the present disclosure. The combiner unit 180 may be directly coupled to the plurality of ports 110 at one side and to the power regulating unit 130 at the other side. As an example, the power regulating unit 130 may support connection of 8 combiner units.

Figure 5:
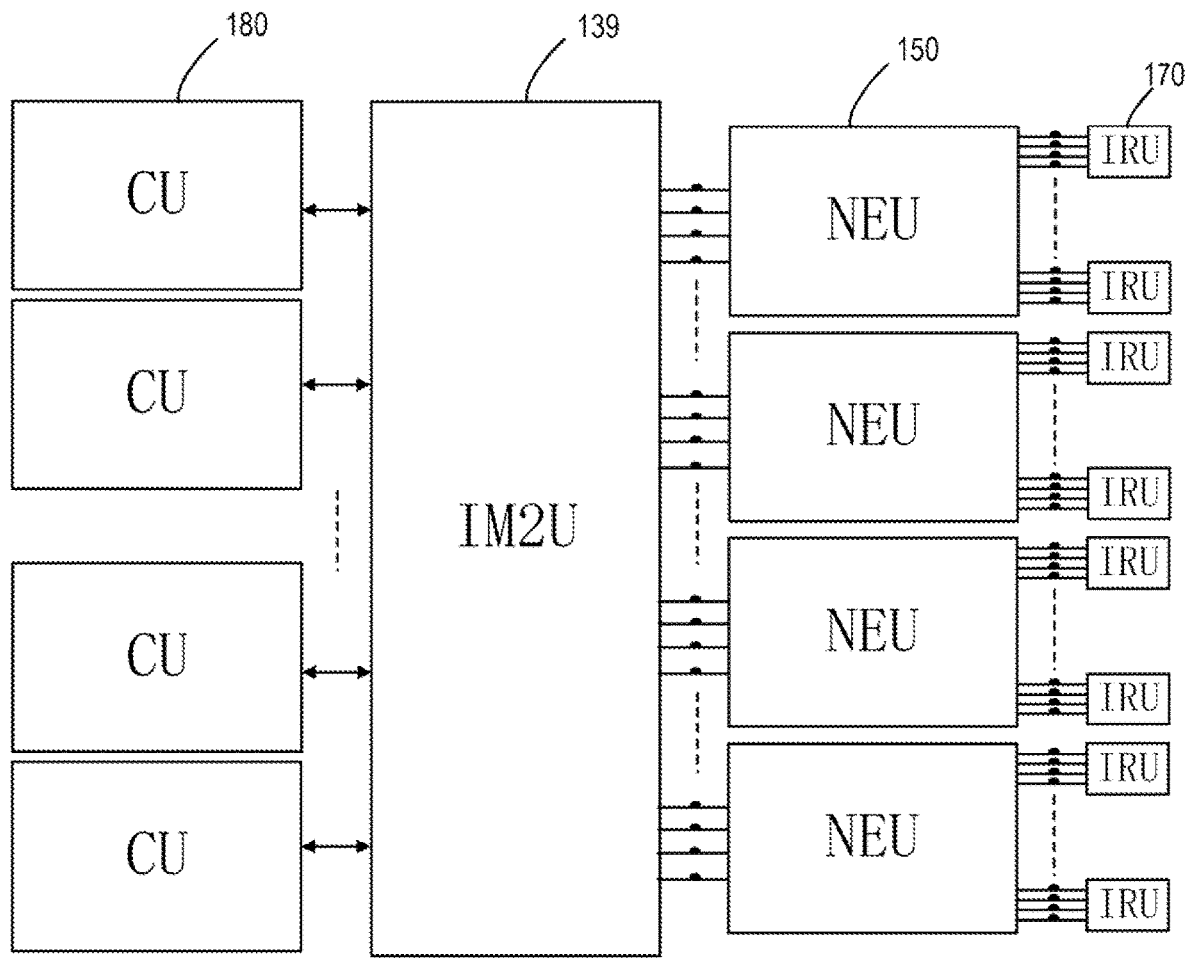
FIG. 5 illustrates a schematic block diagram of a first variant of the distributed antenna system in accordance with embodiments of the present disclosure.
Figure 6:
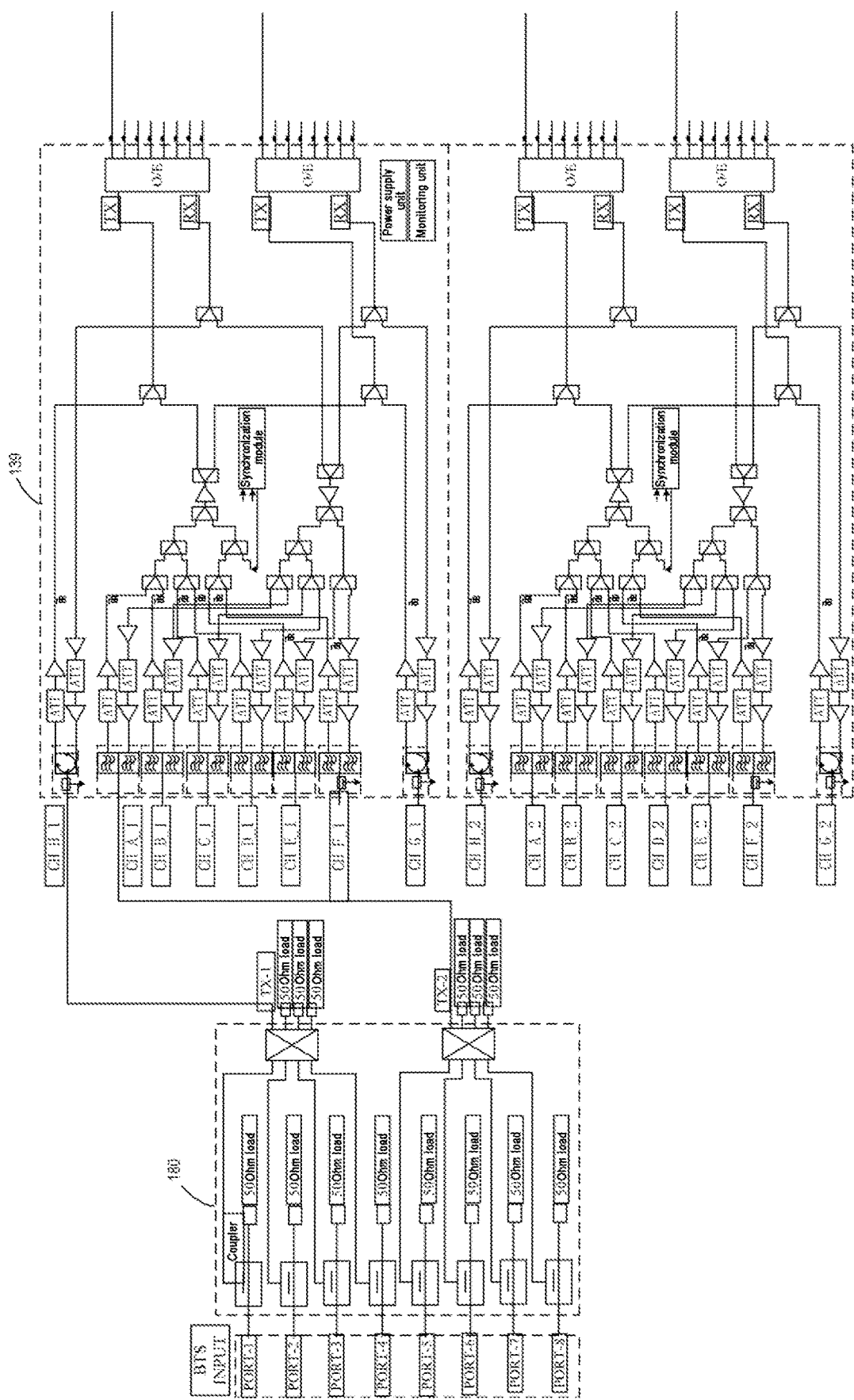
FIG. 6 illustrates a structural diagram of a further power regulating unit of the distributed antenna system in accordance with embodiments of the present disclosure.

FIG. 5 shows a variant of the distributed antenna system 100 of FIG. 1 and FIG. 6 demonstrates a structural diagram of the power regulating unit 139 of the distributed antenna system 100. According to FIGS. 5 and 6, the power regulating unit 130 may be replaced by the power regulating unit 139, wherein the power regulating unit 139 may be referred to as Master Unit (IM2U). Compared to the Power Balance Master Unit (PBMU) shown in FIG. 2, the power regulating unit 139, as IM2U, may only include partial circuit of the PBMU. For example, IM2U may exclude the first combiner section 133, the second link 134 and the second power regulating section 135. In other words, the IM2U may skip the step of regulating signals of different operators within the same frequency band, to simplify the structure of the power regulating unit and lower its costs. This is suitable when the single frequency band does not include various operator signals. In this implementation, the combiner unit 180 combines the respective channels of base station signals or information source signals and then outputs them to the power regulating unit 139. Only one or two channels of signals are allowed for transmission between the combiner unit 180 and the power regulating unit 139. In this way, the signals are combined for output to reduce the cables required for transmission.

Figure 7:
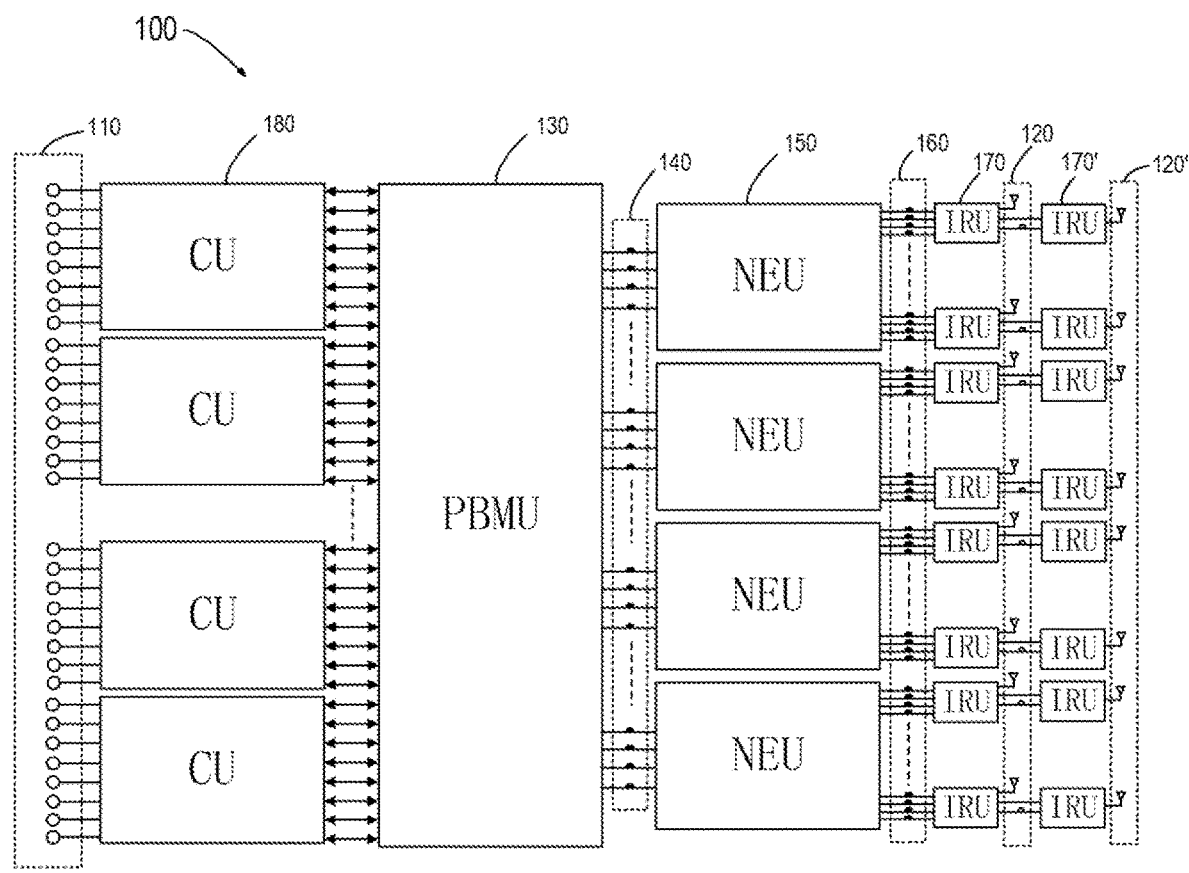
FIG. 7 illustrates a schematic block diagram of a second variant of the distributed antenna system in accordance with embodiments of the present disclosure.

FIG. 7 illustrates a second variant of the distributed antenna system 100 of FIG. 1. According to FIG. 7, the distributed antenna system 100 may include a plurality of second antennas 120' configured to transmit downstream signals or receive upstream signals. The distributed antenna system 100 also may include one or more second optical integrated remote units/circuits 170' coupled to the one or more first optical integrated remote units 170 in cascade and further to the plurality of second antennas 120'. Alternatively, one or more second optical integrated remote units 170' may include a plurality of second antennas 120', i.e., the second antenna 120' is provided as a part of the second optical integrated remote unit 170'. Similar to the first optical integrated remote unit 170, a single second optical integrated remote unit 170' also may support coupling to a plurality of antennas (e.g., 8 antennas), or the second antenna 120' may be integrated or built in the second optical integrated remote unit 170'. For instance, a single second optical integrated remote unit 170' may be provided with 8 antennas therein. One or more second optical integrated remote unit 170' may be configured to receive electric power, convert between optical signals and electric signals, and compensate the signals. As an example, the second optical integrated remote unit 170' may have a structure similar to the first optical integrated remote signal 170 and may be cascaded to one corresponding first optical integrated remote unit 170. Therefore, the first optical integrated remote unit 170 may supply power to the second optical integrated remote unit 170' and transfer power-split optical signals to the second optical integrated remote unit 170' of the second stage. In this way, the downstream signals from the information source may be expanded to more antennas and transferred to the mobile terminals within a wider space range. Alternatively, the upstream signals may be received via more antennas from the mobile terminal within a wider space range. In one embodiment, one or more second optical integrated remote units 170' are connected to one or more first optical integrated remote units 170 in cascade by a one-to-one manner. By means of the one-to-one manner, the cascade extension may be simply and effectively implemented. However, it should be appreciated that the second optical integrated remote units 170' may be cascaded to the first optical integrated remote unit 170 through other suitable ways, such as one-to-many, many-to-one or many-to-many etc.

Figure 8:
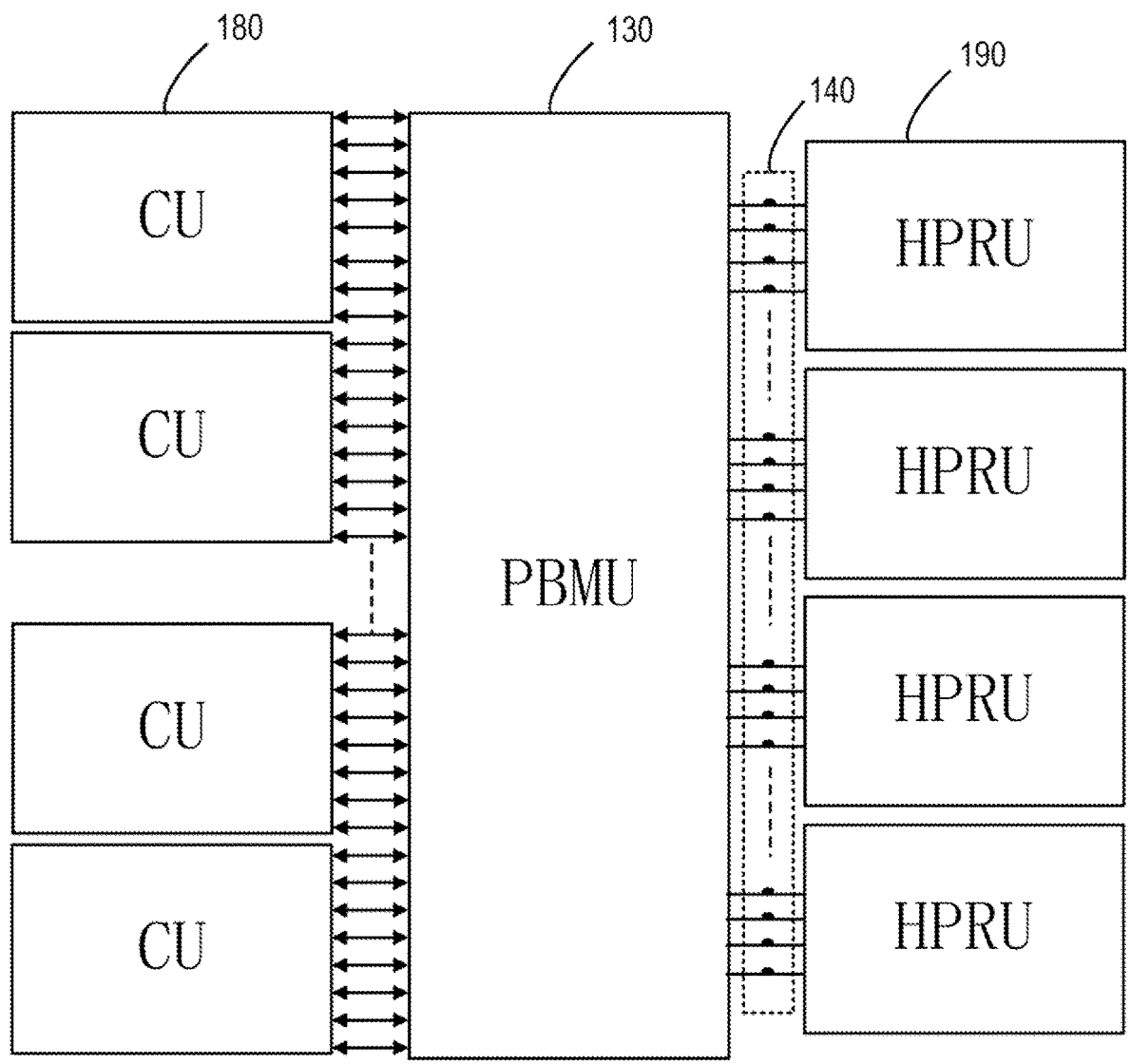
FIG. 8 illustrates a schematic block diagram of a third variant of the distributed antenna system in accordance with embodiments of the present disclosure.

FIG. 8 illustrates a third variant of the distributed antenna system 100 of FIG. 1. As shown in FIG. 8, the distributed antenna system 100 includes one or more first high power remote units/circuits (HPRU) 190 coupled between the one or more optical fibers 140 and the plurality of first antennas 120, and configured to convert between optical signals and electric signals and compensate the signals. A two-tier architecture with high power may be constructed via the first high power remote unit HPRU 190. Accordingly, the information source signals at multiple frequency bands from various operators are transferred via optical fibers or cables to the HPRU end to implement signal coverage. In comparison to the optical integrated remote unit IRU, the high power remote unit HPRU can receive and transmit greater power and may be coupled to more antennas, thereby fulfilling a wider range of signal coverage with fewer remote units.

Figure 9:
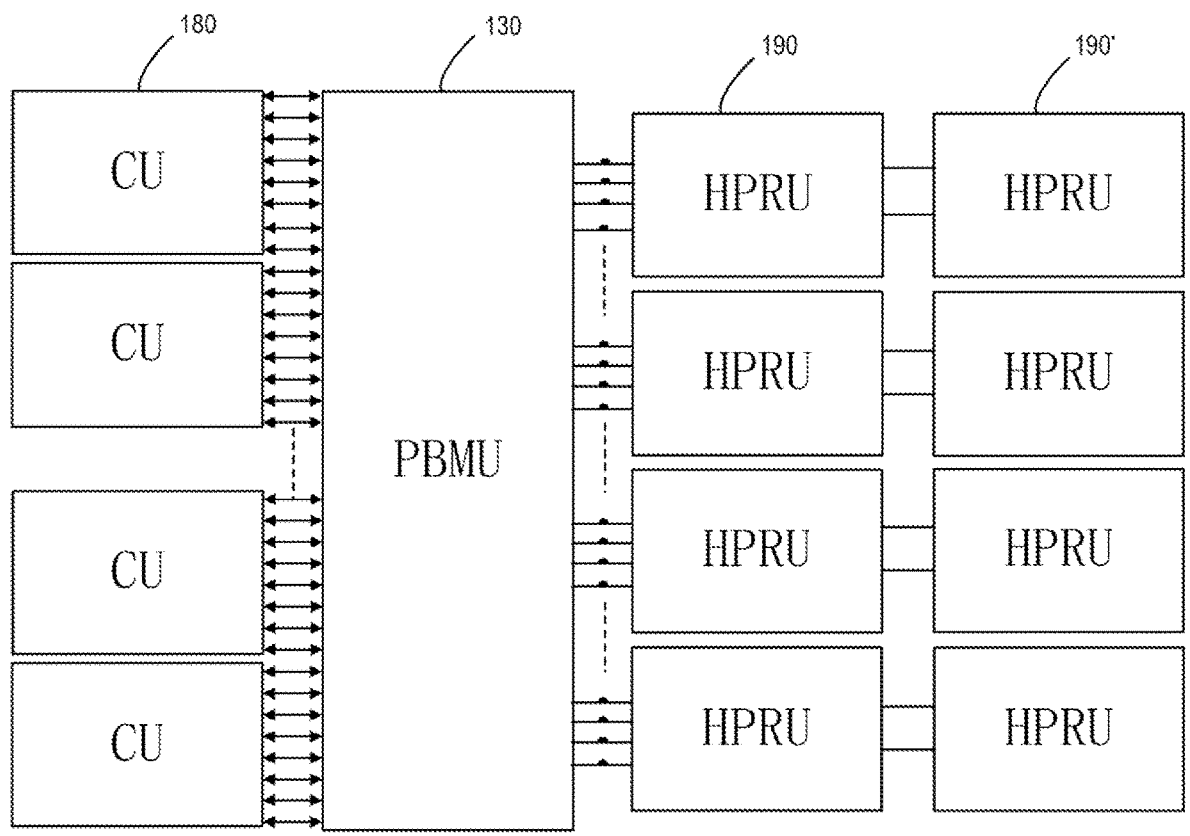
FIG. 9 illustrates a schematic block diagram of a fourth variant of the distributed antenna system in accordance with embodiments of the present disclosure.

FIG. 9 illustrates a fourth variant of the distributed antenna system 100 of FIG. 1. According to FIG. 9, the distributed antenna system 100 also includes a plurality of second antennas 120' and one or more second high power remote units/circuits 190', where the plurality of second antennas 120' is configured to transmit downstream signals or receive upstream signals, and the one or more second high power remote units 190' are coupled between the one or more first high power remote units 190 and the plurality of second antennas 120' in cascade and configured to convert between optical signals and electric signals and compensate the signals. Similar to the implementation of FIG. 7, the high power remote unit HPRU may also adopt the cascade manner, i.e., the second high power remote unit 190' for example is cascaded to the corresponding first high power remote unit 190 via the cables. In this way, the downstream signals from the information source may be expanded to more antennas and transferred to the mobile terminals within a wider space range. Alternatively, the upstream signals may be received via more antennas from the mobile terminal within a wider space range. In one embodiment, one or more second high power remote units 190' are connected to one or more first high power remote units 190 in cascade by a one-to-one manner.

By means of the one-to-one manner, the cascade extension may be simply and effectively implemented. However, it should be appreciated that the second high power remote units 190' may be cascaded to the first high power remote units 190 through other suitable ways, such as one-to-many, many-to-one or many-to-many etc.

Figure 10:
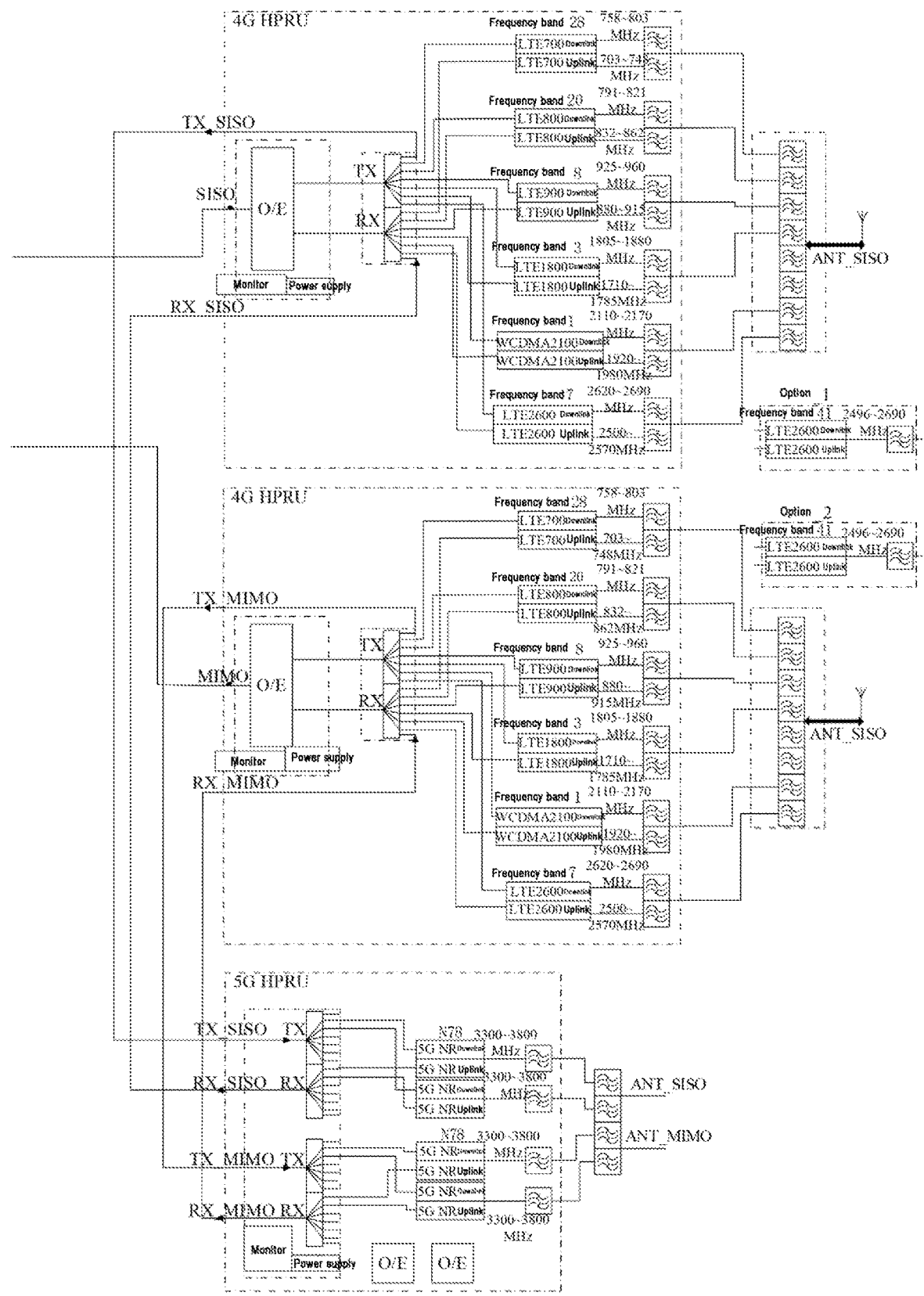
FIG. 10 illustrates a structural diagram of a first high power remote unit and a second high power remote unit of the distributed antenna system in accordance with embodiments of the present disclosure.

FIG. 10 illustrates a structural diagram of the first high power remote unit 190 and the second high power remote unit 190'. As an example, the first high power remote unit 190 or the second high power remote unit 190' may be 4G HPRU or 5G HPRU, where 4G HPRU may support transmission and coverage at different frequency bands including LTE700, LTE800, LTE900, LTE1800, LTE2600 and WCDMA2100 etc., and 5G HPRU may support transmission and coverage of 5G NR signals.

Figure 11:
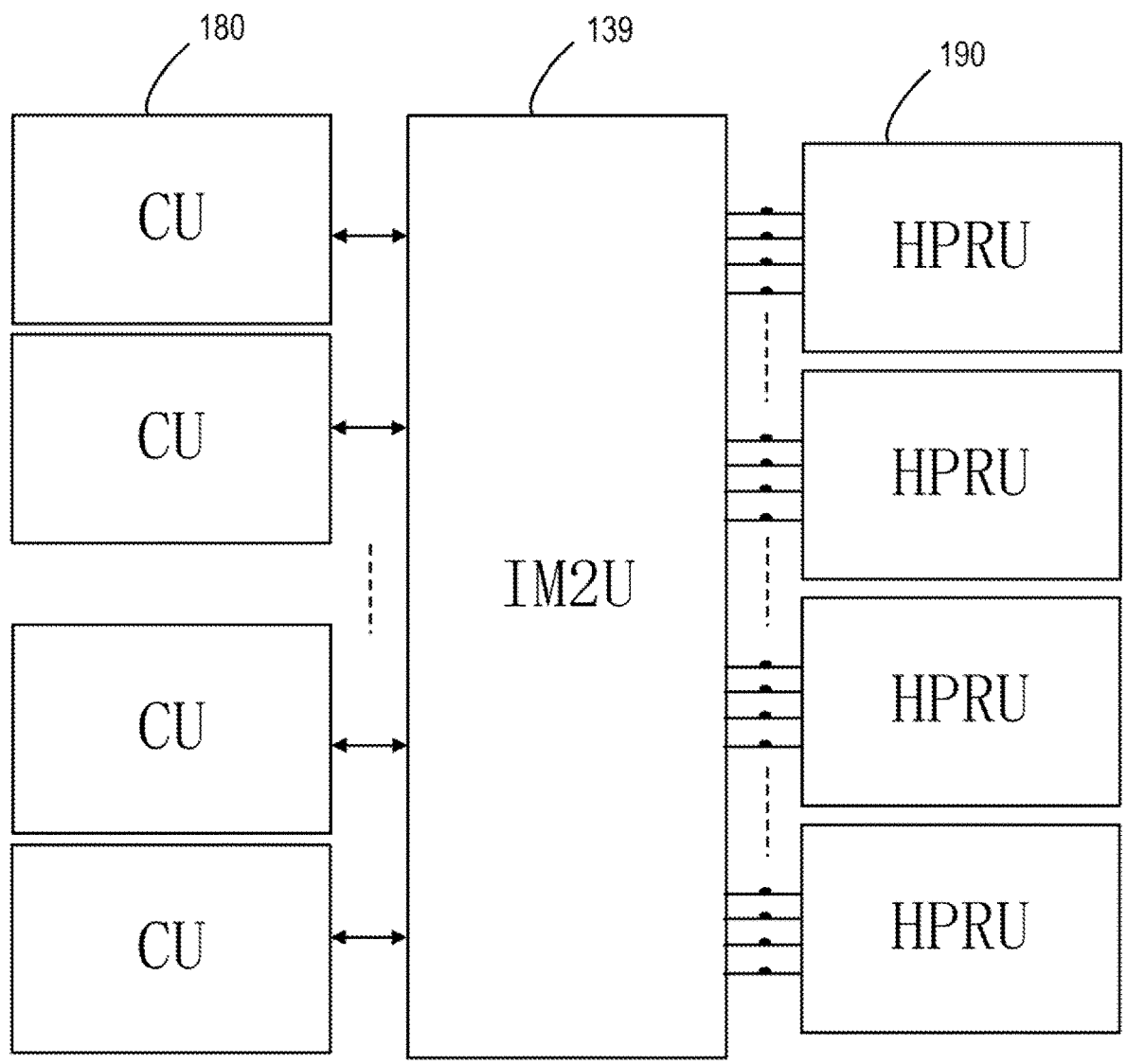
FIG. 11 illustrates a schematic block diagram of a fifth variant of the distributed antenna system in accordance with embodiments of the present disclosure.
Figure 12:
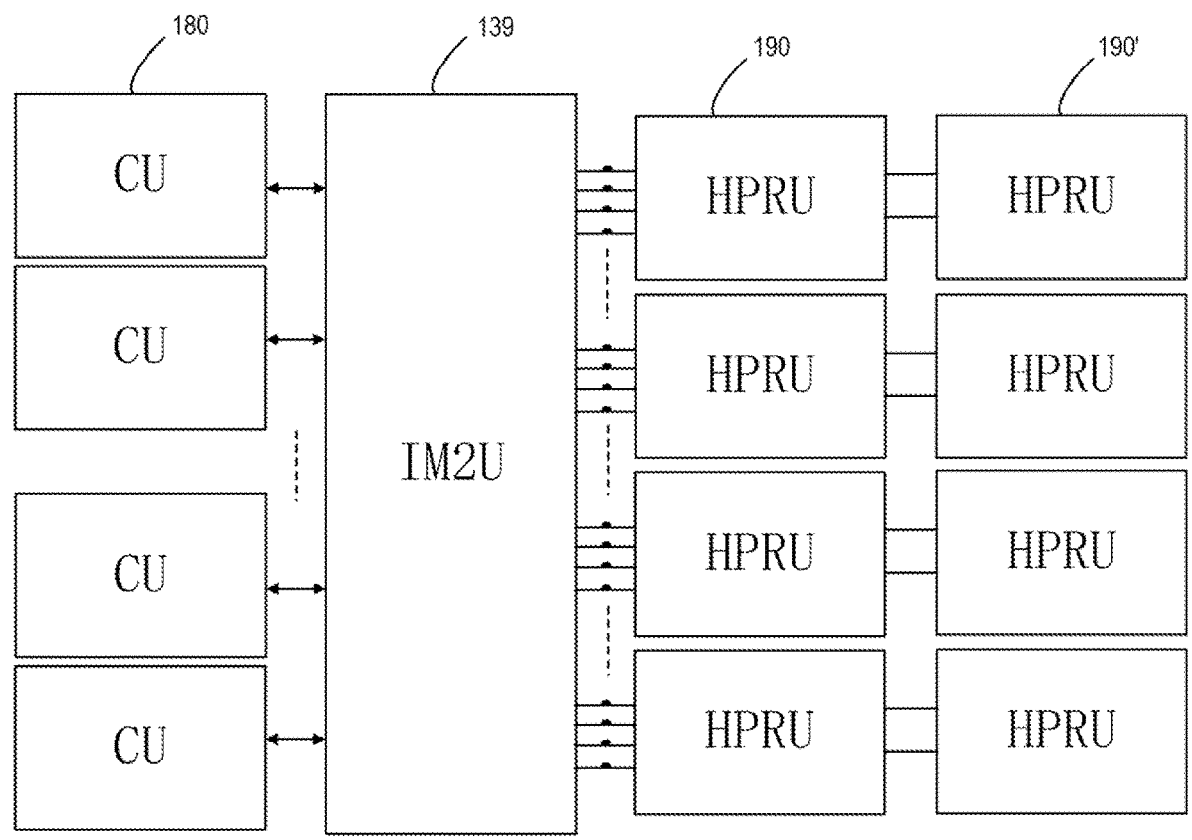
FIG. 12 illustrates a schematic block diagram of a sixth variant of the distributed antenna system in accordance with embodiments of the present disclosure.
Figure 13:
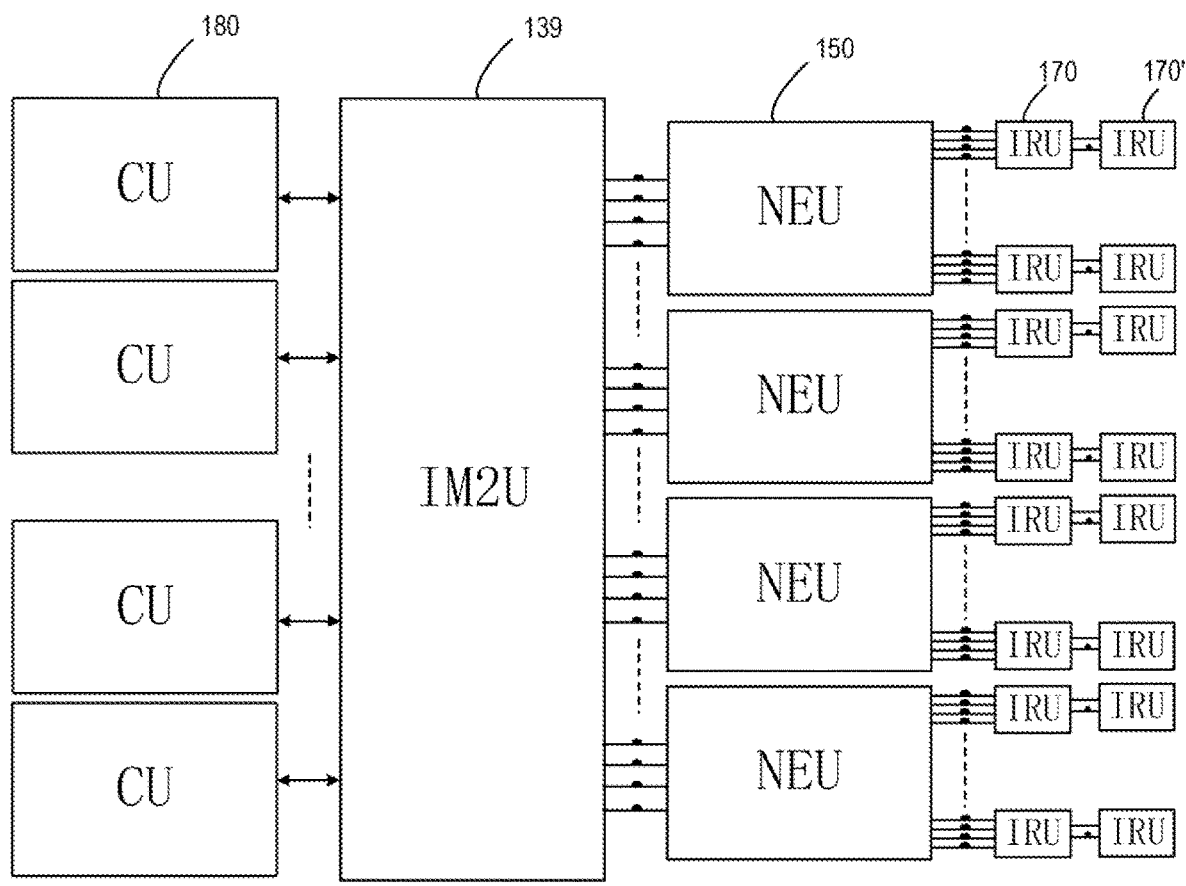
FIG. 13 illustrates a schematic block diagram of a seventh variant of the distributed antenna system in accordance with embodiments of the present disclosure.

FIGS. 11, 12 and 13 illustrate a fifth variant, a sixth variant and a seventh variant of the distributed antenna system 100 of FIG. 1 respectively. In the fifth variant of the distributed antenna system 100 shown by FIG. 11, the power regulating unit PBMU 130 in FIG. 1 is replaced by the power regulating unit IM2U 139, and the optical network extender unit 150 and the first optical integrated remote unit 170 are substituted with the first high power remote unit 190.

Compared to the fifth variant, the sixth variant of the distributed antenna system 100 in FIG. 12 additionally includes the second high power remote unit 190' in cascade with the first high power remote unit 190. Within the seventh variant of the distributed antenna system 100 illustrated in FIG. 13, the power regulating unit PBMU 130 in the second variant (shown by FIG. 7) is replaced by the power regulating unit IM2U 139. Hence, the distributed antenna system 100 may be constructed in various ways based on the users' needs.

The embodiments of the present disclosure may regulate power balance between different frequency bands and/or various operators in the distributed antenna system, and provide any combinations of the plurality of frequency bands (e.g., 8 frequency bands), so as to improve coverage of the wireless communications. In addition, the communication network constructed in accordance with the distributed antenna system of the present disclosure may support MIMO (e.g., 2×2 MIMO, 4×4 MIMO) 4G and 5G independent networking and hybrid networking, as well as 4G TDD LTE and 4G NR TDD.

Through the above description and teachings provided in the related drawings, many modifications and other implementations of the present disclosure disclosed herein will be conceived by those skilled in the field related to the present disclosure. It is to be understood that the implementations of the present disclosure are not limited to the specific implementations disclosed herein, and the modifications and other implementations are included within the scope of the present disclosure. Besides, although the example implementations have been described in the context of some example combinations of the components and/or functions with reference to the related drawings, it should be recognized that different combinations of the components and/or functions may be provided by alternative implementations without deviating from the scope of the present disclosure. As far as this is concerned, other combinations of components and/or functions distinct from the above clearly described ones are also expected to fall within the scope of the present disclosure. Although specific terms are used here, they only convey generic and descriptive meanings and are not intended as restrictions.

We claim:

1. A distributed antenna system, comprising:
   a plurality of ports configured to receive downstream signals or transmit upstream signals;
   a plurality of first antennas configured to transmit the downstream signals or receive the upstream signals;
   a power regulating unit coupled between the plurality of ports and the plurality of first antennas and configured to transfer and regulate the downstream signals or the upstream signals, wherein the power regulating unit includes components:
   a plurality of first links each corresponding to a respective frequency band of different frequency bands;
   a plurality of second links each corresponding to one port of the plurality of ports, and coupled to the corresponding port at one side, wherein the plurality of second links are divided into a plurality of groups, and each group transfers second link signals within a respective frequency band of the different frequency bands, and each group corresponds to a respective first link of the plurality of first links; and
   a first power regulating section coupled to the plurality of first links and configured to regulate power of link signals transferred over each of the first links, such that link signals of the different frequency bands transferred over the plurality of first links have substantially the same power.

2. The distributed antenna system of claim 1, further comprising:
one or more optical fibers coupled between the power regulating unit and the plurality of first antennas and configured to transfer optical signals between the power regulating unit and the plurality of first antennas.

3. The distributed antenna system of claim 2, wherein the power regulating unit further comprises:
a second combiner section; and
a photoelectric converter section coupled at one side to the plurality of first links via the second combiner section, and at the other side to the one or more optical fibers, wherein the photoelectric converter section is configured to convert between electric signals and optical signals.

4. The distributed antenna system of claim 3, wherein the photoelectric converter section comprises an analog ultra-wide band laser module configured to detect power values of the optical signals in real time.

5. The distributed antenna system of claim 2, further comprising:
one or more optical network extender units coupled to the one or more optical fibers and configured to compensate and extend optical signals of the one or more optical fibers, to obtain more channels of optical signals;
one or more photoelectric composite cables coupled to the one or more optical network extender units and configured to transfer optical signals and electric power; and
one or more first optical integrated remote units coupled to the one or more photoelectric composite cables and further coupled to the plurality of first antennas, or including the plurality of first antennas, and wherein the one or more first optical integrated remote units are configured to receive electric power, convert between optical signals and electric signals, and compensate signals.

6. The distributed antenna system of claim 5, further comprising:
one or more second optical integrated remote units coupled to the one or more first optical integrated remote units in cascade and further coupled to a plurality of second antennas that are configured to transmit the downstream signals or receive the upstream signals, or including the plurality of second antennas, and wherein the one or more second optical integrated remote units are configured to receive electric power, convert between optical signals and electric signals, and compensate signals.

7. The distributed antenna system of claim 6, wherein the one or more second optical integrated remote units are cascaded to the one or more first optical integrated remote units in one-to-one manner.

8. The distributed antenna system of claim 6, wherein each of the one or more first optical integrated remote units and the one or more second optical integrated remote units comprises a duplexer or a circulator and an isolating switch located on each radio frequency link,
wherein the duplexer or circulator is configured separate link signals in each radio frequency link into uplink signals and downlink signals, and the isolating switch is configured to adjust radio frequency attenuation to maximum if a radio frequency link in which the isolating switch is located is free of signals.

9. The distributed antenna system of claim 2, further comprising:
one or more first high power remote units coupled between the one or more optical fibers and the plurality of first antennas and configured to convert between optical signals and electric signals and compensate signals.

10. The distributed antenna system of claim 9, further comprising:
a plurality of second antennas configured to transmit the downstream signals or receive the upstream signals; and
one or more second high power remote units coupled between the one or more first high power remote units and the plurality of second antennas in a cascade manner, and configured to convert between optical signals and electric signals and compensate signals.

11. The distributed antenna system of claim 10, wherein the one or more second high power remote units are cascaded to the one or more first high power remote units in one-to-one manner.

12. The distributed antenna system of claim 2, further comprising:
one or more combiner units coupled between the plurality of ports and the power regulating unit.

13. The distributed antenna system of claim 1, wherein the power regulating unit further comprises:
a first combiner section;
wherein each group of the plurality of groups of the second links is coupled to the corresponding first link via the first combiner section at the other side; and
a plurality of second power regulating sections each corresponding to one of the plurality of groups and configured to regulate power of the second link signals transferred over each of the second links in the corresponding group, such that the second link signals of different properties transferred over respective second links in the corresponding group have substantially the same power.

14. The distributed antenna system of claim 13, wherein the power regulating unit further comprises:
a second combiner section; and
a photoelectric converter section coupled at one side to the plurality of first links via the second combiner section, and at the other side to the one or more optical fibers, wherein the photoelectric converter section is configured to convert between electric signals and optical signals.

15. The distributed antenna system of claim 13, wherein the first power regulating section or the each second power regulating section comprises:
an attenuator located over each first link or each second link in the corresponding group, a detector for detecting link signals of each first link or second link signals of each second link in the corresponding group, and a controller that controls the attenuator based on detection signals of the detector.

16. The distributed antenna system of claim 13, further comprising:
one or more combiner units coupled between the plurality of ports and the power regulating unit.

17. The distributed antenna system of claim 1, wherein each first link of the plurality of first links comprises a duplexer or a circulator configured to separate link signals in each first link into uplink signals and downlink signals.

18. The distributed antenna system of claim 17, further comprising:

one or more combiner units coupled between the plurality of ports and the power regulating unit.

19. The distributed antenna system of claim 1, further comprising:
one or more combiner units coupled between the plurality of ports and the power regulating unit.

20. The distributed antenna system of claim 1, wherein the second link signals within the respective frequency band are from different operators.

* * * * *